3,138,624
ESTERIFICATION PROCEDURE
Keith Liddell Johnson, Park Forest, Ill., assignor to Swift & Company, Chicago, Ill., a corporation of Illinois
No Drawing. Filed Oct. 4, 1962, Ser. No. 228,229
6 Claims. (Cl. 260—410.6)

This invention relates to an improved method for esterification and more particularly to improvements in the alcoholysis of higher fatty acids to produce a variety of esters having diverse uses.

In the esterification of many acids with alcohols, it is necessary to utilize high temperatures in order to effect esterification. Such elevated temperatures often result in the production of highly colored products, particularly where ethylenically unsaturated materials are employed. Operating temperatures can be lowered by the use of catalysts such as organic sulfonic acids and inorganic mineral acids, but these catalysts promote corrosion and the reaction must be conducted in special corrosion-resistant equipment or glass. Further, acids such as sulfuric acid or sulfonic acids also contribute to increased coloration in the product. Other substances, while they are effective in catalyzing the esterification reaction, are also rapidly poisoned by the water produced during the esterification and cannot be economically employed. In general, strongly basic and strongly acidic compounds used heretofore as catalysts possess disadvantages in causing undesirable side reactions or they are not sufficiently active to accelerate the reaction to a sufficient degree to render their use economically advantageous.

It is, therefore, an object of this invention to provide an improved method of esterification of carboxylic acids with alcohols whereby coloration in the final product is substantially reduced.

Another object of the invention is the provision of a rapid and economical esterification procedure for converting higher fatty acids into higher fatty acid esters in high yield.

Additional objects, if not specifically set forth herein, will be readily apparent from the detailed description of the invention which follows.

Generally, it is within the contemplation of the present invention to conduct an esterification reaction between an organic carboxylic acid and an alkylenoxy alcohol in the presence of a substituted quinone or hydroquinone whereby a very rapid esterification takes place, producing esters in high yield. The substituted quinones and substituted hydroquinones are unique in that they promote esterification even when present in very small amounts and they are relatively unaffected by either the reactants or the reaction products. Many catalysts suitable for use in ester interchange reactions cannot be employed in direct esterification processes inasmuch as such catalysts are rendered ineffective by compounds possessing available carboxyl groups. The substituted quinones and the substituted hydroquinones of this invention, on the other hand, are very effective even in the presence of carboxylic acids.

More specifically, the invention is directed to improvements in the manufacture of esters of carboxylic acids by heating and reacting the carboxylic acids and the desired alcohols at an esterification temperature in the presence of a catalytic amount of a compound or mixture of compounds represented by the formula

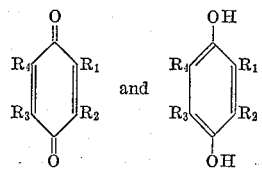

where $R_1$, $R_2$, $R_3$ and $R_4$ are selected from the group consisting of H and lower aliphatic hydrocarbon radicals. Alkyl groups typifying the aliphatic hydrocarbon radical include the substituted and unsubstituted hydrocarbons having 1–9 carbons such as the methyl, ethyl, propyl, butyl and amyl, through nonyl radicals. Primary, secondary, and tertiary aliphatic hydrocarbon radicals can be substituted on the quinone or hydroquinone nucleus. Examples of such radicals are isobutyl, isoamyl, secondary butyl, tertiary butyl, and tertiary amyl.

Different o-substituents cause variations in activity of the substituted quinone or hydroquinone and generally as the carbon attached to the quinone or hydroquinone ring goes from primary to secondary to tertiary catalytic activity is enhanced. Thus, tertiary butyl substituted quinones and hydroquinones are more highly active than the corresponding butyl derivatives. The alkyl substituted quinones and hydroquinones are very effective in promoting a rapid high yield estrification procedure. The catalysts are relatively inert to the reactants and the reaction products under esterification conditions and the amount of undesirable by-products formed is negligible.

The esterification is carried out by heating a mixture of the carboxylic acid and an alkylenoxy alcohol in the presence of a catalytic amount of the substituted quinone or hydroquinone. Usually about 0.1–5% of the catalyst will be employed and the amount used will depend upon the activity of the catalyst and the particular acid and alcohol being combined to form the ester. In some cases it may be desirable to use an inert organic solvent in the esterification, but in most cases a solvent is not required. If a solvent is employed the nonpolar benzenoid type solvents such as benzene or toluene are very satisfactory.

In carrying out the reaction, conventional esterification techniques are employed and the reaction mixture is heated to initiate the reaction. When the mixture of reactants is heated, starting of the esterification reaction is noted by the evolution of water and condensation and removal of the water thus formed can be carried out to further accelerate the reaction. Moreover, the free fatty acid content of the starting reaction mixture decreases as the free carboxyl groups of the starting acid are esterified. Thus, completion of the reaction is evident at that point at which no additional water is evolved or when the free fatty acid content of the reaction mixture reaches a minimum. Generally, the reaction is carried out at a temperature at which water evolves from the reaction mixture and this temperature can vary between about 130–200° C. although in some cases higher or lower reaction temperatures will be preferred. In all cases the reaction mixture will be heated to that point at which water is evolved, but the reaction temperature should be held below the point at which pyrolysis of the products takes place. In most cases the reaction will be carried out at a temperature of about 170–180° C. The reaction can be speeded up if desired by the use of vacuum and by removal of the water split out in the alcoholysis reaction.

The improved method is particularly useful in the manufacture of esters of higher fatty acids having about 10–22 carbon atoms and monohydric and dihydric alcohols containing alkylenoxy radicals. Esters of monocarboxylic acids such as capric, lauric, myristic, palmitic, stearic, ricinoleic, lauroleic, myristoleic, palmitoleic, oleic, linoleic, and linolenic acids can be formed with aliphatic monohydric alcohols having about 1–8 carbons or dihydric aliphatic alcohols having about 2–6 carbons.

The alcohols employed as the alcohol moiety of the ester should contain ether linkages such as ethylenoxy, propylenoxy or butylenoxy radicals. The oxyalkylene alcohol esters possess substantial surface tension reducing properties and can be produced very efficiently in accordance with the method disclosed, and claimed herein. Polyoxyalkylene alcohols which can be employed in the formation of such esters include those polyoxyalkylene glycols having about 2–20 oxyalkylene groups. Ether and ester derivatives of such polyoxyalkylene glycols are also contemplated. Although the alkylene portion of such materials in the preferred form of the invention comprises an ethylene group, it should be understood that polyoxypropylene and polyoxybutylene glycols and ether and ester derivatives thereof are also contemplated.

Oxyalkylene alcohols which are contemplated as the alcohol reactant in the process of the invention include aliphatic monohydric oxyalkylene alcohols and aliphatic dihydric oxyalkylene alcohols having about 1–100 and preferably about 1–20 oxyalkylene groups. Polyethylene glycols, polypropylene glycols, and polybutylene glycols of varying molecular weights and having one or more oxyalkylene groups in the alcohol chain are very satisfactory. Monohydric oxyalkylene alcohols suitable for use in the process include the ether and ester derivatives of the glycols as well as adducts of the glycols. Ethers of such glycols with lower aliphatic radicals (1–4 carbons) are very satisfactory as the alcohol reactant. Specific compounds coming within this group are methyl Cellosolve, ethyl Cellosolve, butyl Cellosolve, and the lower alkyl ethers of diethylene glycols such as butyl Carbitoe.

Aromatic ethers of such glycols have also been employed in the invention with considerable success. The alkyl phenol adducts of polyoxyalkylene glycol such as the alkyl phenolethylene oxide condensates can be coupled with carboxylic acids to produce highly active emulsifiers. An alkyl phenol-ethylene oxide condensate having 6–12 mols of ethylene oxide for each mol of phenol and wherein the alkyl group on the phenol contains 8–14 carbons is particularly useful.

The fatty acid derivatives of the polyoxyalkylene base materials, particularly the esters thereof, can be manufactured by the method of the invention. Esters of oxyalkylene alcohols and fatty acids having 10–22 carbons such as the fatty acid mixtures derived from naturally occurring glyceride oils are illustrative of this group. The tall oil fatty acid adduct of polyethylene glycol having 12–18 and preferably about 12–16 oxyethylene groups is an example of a monohydric alcohol which can be esterified with fatty acids in accordance with the method of the invention to provide particularly interesting derivatives. The ortho-substituted quinones and hydroquinones of the invention appear to exert a peculiar effect in catalyzing the reaction wherein the alcohol reactant is a polyoxyalkylene glycol or derivative thereof.

Typical esterifications illustrating the procedure of the invention are set forth in the examples which follow. It should be understood that these examples are not to be considered as limiting the invention, however.

*Example I*

1,000 grams of polyethylene glycol, having a molecular weight of 1,000 was melted and agitated with 500 grams of stearic acid in the presence of 7 grams of o-methyl hydroquinone. The reaction mixture was heated and agitated and start of the reaction was evidenced by the evolution of water at a temperature of 190° C. The reaction mixture was held at this temperature for 3½ hours at which time the evolution of water had stopped. The product was a waxy solid which, when added to water, produced foam. The reaction was much more rapid than a similar reaction carried out using no catalyst and the yield in this case was 91%, whereas utilizing no catalyst the yield was only 43%.

*Example II*

550 grams of the methyl ether of polyoxyethylene glycol having a molecular weight of 550 was mixed with 275 grams of oleic acid and 4 grams of 2,5-ditertiary butyl hydroquinone was added to the mixture. The reaction mixture was agitated and heated gradually to a temperature of 170° C. at which point water was evolved from the mixture. The water was condensed and removed and the reaction was carried out at a temperature of about 180° until no more water evaporated. The product was a viscous liquid having excellent emulsifying properties and was much paler in color than a similar product prepared using toluene sulfonic acid as catalyst.

Other substituted quinones and hydroquinones such as 2,5-diethyl quinone and 2,5-di(1,1,3,3-tetramethyl)butyl hydroquinone can also be employed in a similar fashion.

The esterification method disclosed and claimed herein is particularly advantageous in that the production of undesirable by-products is held to a minimum. The presence of by-products is evident from the color of the ester produced. Thus highly colored products contain a substantial amount of by-products while those esters having less by-products are pale or light colored. An additional benefit provided by the improved process is the fact that the process can be carried out in conventional equipment since the catalyst is non-corrosive. The use of highly acidic catalysts such as sulfuric acid or sulfonic acids requires that reaction vessels be constructed of corrosion resistant stainless steel or the reaction vessels must be lined with a corrosion resistant liner.

Obviously, many modifications and variations of the invention as hereinbefore set forth may be made without departing from the spirit and scope thereof and, accordingly, only those limtations should be imposed as are indicated in the appended claims.

I claim:

1. An improved method of manufacturing esters of higher fatty acids and ether-alcohols comprising: heating said higher fatty acids and alkyleneoxy alcohols in the presence of a catalytic amount of a material selected from the group consisting of ortho-substituted quinones having lower aliphatic hydrocarbon substitutents, ortho-substituted hydroquinones having lower aliphatic hydrocarbon substituents, and mixtures thereof to an esterification temperature whereby to promote the evolution of water from the catalyzed mixture.

2. In the manufacture of esters of higher fatty acids wherein said higher fatty acids are esterified with oxyalkylene alcohols, the improvement comprising: conducting the esterification reaction in the presence of a catalytic amount of a material selected from the group consisting of ortho-substituted quinones having lower aliphatic hydrocarbon substituents, ortho-substituted hydroquinones having lower aliphatic hydrocarbon substituents, and mixtures thereof.

3. An improved method for manufacturing esters of higher fatty acids and alcohols comprising: heating and reacting aliphatic carboxylic acids of about 10–22 carbons with oxyalkylene alcohols in the presence of a material selected from the group consisting of ortho-substituted quinones having lower aliphatic hydrocarbon substituents, ortho-substituted hydroquinones having lower aliphatic hydrocarbon substituents, and mixtures thereof.

4. The method of claim 3 wherein the ortho-susbtituted quinone is 2,5-ditertiary butyl hydroquinone.

5. The method of claim 3 wherein the ortho-substituted hydroquinone is methyl hydroquinone.

6. An improved method of manufacturing polyoxyalkylene esters of higher fatty acids wherein a polyoxyalkylene glycol is reacted with a higher fatty acid comprising: conducting the reaction in the presence of a catalytic amount of a material selected from the group consisting of ortho-substituted quinones having lower aliphatic hydrocarbon substituents, ortho-substituted hydroquinones having lower aliphatic hydrocarbon substituents, and mixtures thereof.

References Cited in the file of this patent

UNITED STATES PATENTS

| | | |
|---|---|---|
| 2,678,935 | Sundberg et al. | May 18, 1954 |
| 2,950,313 | Kirkpatrick | Aug. 23, 1960 |
| 3,012,049 | Bill | Dec. 5, 1961 |